US007650566B1

(12) United States Patent
Jones et al.

(10) Patent No.: US 7,650,566 B1
(45) Date of Patent: Jan. 19, 2010

(54) REPRESENTING LIST DEFINITIONS AND INSTANCES IN A MARKUP LANGUAGE DOCUMENT

(75) Inventors: Brian Jones, Redmond, WA (US); Marcin Sawicki, Kirkland, WA (US); Robert Little, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 160 days.

(21) Appl. No.: 10/731,516

(22) Filed: Dec. 9, 2003

Related U.S. Application Data (63) Continuation-in-part of application No. 10/187,060, filed on Jun. 28, 2002.

(51) Int. Cl.
*G06F 17/00* (2006.01)
(52) U.S. Cl. ............... 715/236; 715/249; 707/102
(58) Field of Classification Search ............ 715/513, 715/523, 236, 234, 249; 707/102
See application file for complete search history.

(56) References Cited

U.S. PATENT DOCUMENTS

| | | | |
|---|---|---|---|
| 4,751,740 A | 6/1988 | Wright | 382/180 |
| 4,864,501 A | 9/1989 | Kucera et al. | 704/8 |
| 4,866,777 A | 9/1989 | Mulla et al. | 704/206 |
| 5,185,818 A | 2/1993 | Warnock | 382/54 |
| 5,295,266 A | 3/1994 | Hinsley et al. | 718/101 |
| 5,557,722 A | 9/1996 | DeRose et al. | 715/513 |
| 5,579,466 A | 11/1996 | Habib et al. | 715/529 |
| 5,586,241 A | 12/1996 | Bauermeister et al. | 395/167 |
| 5,781,714 A | 7/1998 | Collins et al. | 395/171 |
| 5,787,451 A | 7/1998 | Mogilevsky | 715/533 |
| 5,881,225 A | 3/1999 | Worth | 726/17 |
| 5,895,476 A | 4/1999 | Orr et al. | 707/517 |
| 6,023,714 A | 2/2000 | Hill et al. | 715/513 |
| 6,031,989 A | 2/2000 | Cordell | 717/109 |
| 6,044,387 A | 3/2000 | Angiulo et al. | 715/533 |
| 6,092,068 A | 7/2000 | Dinkelacker | 707/100 |
| 6,119,136 A | 9/2000 | Takata et al. | 715/513 |
| 6,141,754 A | 10/2000 | Choy | 726/1 |
| 6,182,029 B1 | 1/2001 | Friedman | 704/9 |

(Continued)

FOREIGN PATENT DOCUMENTS

EP            1230566            8/2002

OTHER PUBLICATIONS

University of Georgia Center for Continuing Education, "Exploring the World-Wide Web, Hypertext Markup Language," Feb. 24, 1999, downloaded pp. 1-7.*

(Continued)

*Primary Examiner*—Laurie Ries
(74) *Attorney, Agent, or Firm*—Merchant & Gould, P.C.

(57) ABSTRACT

An application has its own namespace or namespaces and a schema, or a set of schemas, which can be used by applications to generate and/or validate documents in a unique format. The application can uniquely define the format (and properties) of content in a document such that the document is represented in a native format. The document can be stored externally as a markup language file in accordance with the schema of the application. When the format is stored in a markup language, other applications can validate the document stored in accordance with the native format. The other applications can represent the lists in accordance to the degree to which they are aware of the unique properties of the application used to generate the document.

20 Claims, 5 Drawing Sheets

U.S. PATENT DOCUMENTS

| | | | |
|---|---|---|---|
| 6,209,124 B1 | 3/2001 | Vermeire et al. | 717/114 |
| 6,230,173 B1 | 5/2001 | Ferrel et al. | 715/513 |
| 6,233,592 B1 | 5/2001 | Schnelle et al. | 715/513 |
| 6,249,794 B1 | 6/2001 | Raman | 715/500 |
| 6,336,124 B1 | 1/2002 | Alam et al. | 715/523 |
| 6,397,232 B1 | 5/2002 | Cheng-Hung et al. | 715/523 |
| 6,507,856 B1 | 1/2003 | Chen et al. | 715/513 |
| 6,507,857 B1 | 1/2003 | Yalcinalp | 715/513 |
| 6,519,617 B1 | 2/2003 | Wanderski et al. | 715/513 |
| 6,535,896 B2 | 3/2003 | Britton et al. | 715/523 |
| 6,538,673 B1 * | 3/2003 | Maslov | 715/853 |
| 6,613,098 B1 | 9/2003 | Sorge et al. | 715/503 |
| 6,675,353 B1 | 1/2004 | Friedman | 715/513 |
| 6,697,999 B1 | 2/2004 | Breuer et al. | 715/517 |
| 6,725,423 B1 | 4/2004 | Muramoto et al. | 715/513 |
| 6,725,426 B1 | 4/2004 | Pavlov | 715/523 |
| 6,754,648 B1 | 6/2004 | Fittges et al. | 707/1 |
| 6,763,500 B2 | 7/2004 | Black et al. | 715/513 |
| 6,785,685 B2 | 8/2004 | Soetarman et al. | 707/101 |
| 6,799,299 B1 | 9/2004 | Li et al. | 715/513 |
| 6,829,570 B1 | 12/2004 | Thambynayagam et al. | 703/10 |
| 6,829,745 B2 | 12/2004 | Yassin et al. | 715/513 |
| 6,845,483 B1 | 1/2005 | Carroll | 715/513 |
| 6,886,115 B2 | 4/2005 | Kondoh et al. | 714/52 |
| 6,918,086 B2 | 7/2005 | Rogson | 715/533 |
| 6,928,610 B2 | 8/2005 | Brintzenhofe et al. | 715/517 |
| 6,938,204 B1 | 8/2005 | Hind et al. | 715/515 |
| 6,941,510 B1 | 9/2005 | Ozzie et al. | 715/513 |
| 6,954,898 B1 | 10/2005 | Nakai et al. | 715/542 |
| 6,968,503 B1 | 11/2005 | Chang et al. | 715/526 |
| 6,996,772 B2 | 2/2006 | Justice et al. | 715/513 |
| 7,028,009 B2 | 4/2006 | Wang et al. | 705/51 |
| 7,257,772 B1 | 8/2007 | Jones et al. | 715/530 |
| 7,275,209 B1 | 9/2007 | Jones et al. | 715/513 |
| 7,376,650 B1 | 5/2008 | Ruhlen | 707/6 |
| 7,389,473 B1 | 6/2008 | Sawicki et al. | 715/255 |
| 2001/0014900 A1 | 8/2001 | Brauer et al. | 707/513 |
| 2001/0032217 A1 | 10/2001 | Huang | 707/513 |
| 2002/0087702 A1 | 7/2002 | Mori | 709/228 |
| 2002/0091725 A1 | 7/2002 | Skok | 707/501.1 |
| 2002/0116420 A1 | 8/2002 | Allam et al. | 707/526 |
| 2002/0124115 A1 | 9/2002 | McLean et al. | 709/310 |
| 2002/0184189 A1 | 12/2002 | Hay et al. | 707/1 |
| 2003/0007014 A1 | 1/2003 | Suppan et al. | 345/853 |
| 2003/0018668 A1 | 1/2003 | Britton et al. | 707/513 |
| 2003/0101416 A1 | 5/2003 | McInnes et al. | 715/513 |
| 2003/0135584 A1 | 7/2003 | Roberts et al. | 709/218 |
| 2003/0163784 A1 | 8/2003 | Daniel et al. | 715/514 |
| 2003/0167444 A1 | 9/2003 | Zorc | 715/513 |
| 2003/0231626 A1 | 12/2003 | Chuah et al. | 370/389 |
| 2004/0073871 A1 | 4/2004 | Giannetti | 715/513 |
| 2004/0098320 A1 | 5/2004 | Mitsuhashi et al. | 705/27 |
| 2004/0194035 A1 | 9/2004 | Chakraborty | 715/531 |
| 2004/0205553 A1 | 10/2004 | Hall et al. | 715/513 |
| 2004/0210818 A1 | 10/2004 | Jones et al. | 715/500 |
| 2005/0102265 A1 | 5/2005 | Jones et al. | 707/1 |
| 2005/0108198 A1 | 5/2005 | Jones et al. | 707/1 |
| 2005/0108278 A1 | 5/2005 | Jones et al. | 707/102 |

OTHER PUBLICATIONS

Case Western Reserve University (CRWU), "Introduction to HTML," Case Western Reserve University and Eric A Meyer, Mar. 4, 2000,downloaded pp. 1-157.*

Lemay, Laura, "Teach Yourself Web Publishing with HTML 4 in 14 Days, Professional Reference Edition," Second Edition, Sams.net Publishing, 1997, pp. 778-789.*

White, B. and McDunn, R., "Standard Structural Elements," from "Web Content Accessibility Tips and Tricks," May 1, 2001, downloaded pp. 1-4.*

Juran, J., "MML: The Modest Markup Language," Oct. 22, 2000, downloaded pp. 1-15.*

Case Western Reserve University (CRWU), "Introduction to HTML," Case Western Reserve University and Eric A Meyer, Mar. 4, 2000, downloaded from: web.archive.org/web/20000304042655/http://www.cwru.edu/help/introHTML/toc.html, downloaded pp. 1-157, (previously provided to Applicants).*

Lemay, Laura, "Teach Yourself Web Publishing with HTML 4 in 14 Days, Professional Reference Edition," Second Edition, Sams.net Publishing, 1997, pp. 778-789, (previously provided to Applicants).*

Rohr, Paul, "RE: Styles Again", downloaded from http://www.abisource.org/mailinglists/abiword-dev/01/May/0561.html, May 2001, pp. 1-2.*

Ayers, I., "AbiWorld's Potential", LInux Gazette, Issue 43, Jul. 1999, last downloaded by the Examiner on Dec. 20, 2005 from www.linuxgazette.com/issue43/ayers.html, downloaded pp. 1-4.*

Y. Ishitani, "Document Transformation System from Papers to XML Data Based on Pivot XML Document Method", IEEE Computer Society, Seventh International Conference on Document Analysis and Recognition, 6 pgs., Aug. 3-6, 2003.

"AbiWord", http://en.wikipedia.org/wiki/AbiWord>, Oct. 19, 2005, 2 pgs.

"Case Study: Converting Word Into XML", YAWC Pro, 1 pg.

"Case Study: Maintaining Websites with Microsoft Word", YAWC Pro, 1 pg.

"Case Study: Publishing Content to the Web and Mobile Phones", YAWC Pro., 1 pg.

"Case Study: Typesetting XML with QuarkXPress", YAWC Pro, 1 pg.

"Creating DocBook Documents", Aug. 2, 2001, pp. 1 and 16, http://web.archive.org/web/20020615124747/www.docbook.org/tdg/en/html/ch02.html.

"Introduction to AbiWord", http://web.archive.org/web/20010608211934.www.abisource.com/help/en-US/index.htm, Jun. 8, 2001, 3 pgs.

"Introduction to XML" University of Washington Computing and Communications, copyright 1999, on the Internet as of Jun. 24, 2001, downloaded from http://web.archive.org/web/20010624123830/http://www.wash ington.edu/computing/training/540/xml_well.html, 1 pg.

"Star Office XML File Format Working Draft", Sun Microsystems, Inc., pp. 57, 59.

"TEI, The XML Version of the TEI Guidelines" Text Encoding Initiative [TEI] Consortium, Copyright 2001, with Introductory Note, dated Mar. 2002, downloaded from: http://www.tei-c.org.uk/Drafts/P4/driver.xml, on Nov. 25, 2006, downloaded pp. 1-93.

"XML Schema - Lecture 4 Notes", downloaded from http://www.cs.rpi.edu/~puninj/XMLJ/classes/class4/all.html, Nov. 21, 2001, pp. 1-14.

"XML Schema for Abi Word Markup Language", downloaded from http://www.abisource.com/awml.xsd, May 27, 2000, pp. 1-3.

"XML Schema for AbiWord Markup Language", http://www.abisource.com/awml.xsd>, Apr. 27, 2000, 3 pgs.

"XML Schema Part I: Structures", W3C Recommendation, May 2, 2001, downloaded from http://www.w3.org/TR2001/REC-xmlschema-1-20010502/, pp. 1-19.

"YAWC Pro 1.0 Installation & User Guide", pp. 1-11.

Alschuler, Liora, "Getting the Tags In: Vendors Grapple With XML-Authoring, Editing and Cleanup", Seybold Report on Internet Publishing, vol. 5, No. 6, Feb. 2001, pp. 1-6.

Altamura et al., "Transforming paper documents into XML format with Wisdom++", Nov. 7, 2000, IJDAR, pp. 6-12.

Altova Inc. & Altova GmbH, "XML Spy 4.0 Manual," copyright 1998-2001, Sep. 10, 2001, downloaded from: http://www.altova.com/download.sub.--archive.html and link, pp. 18-286.

Altova Inc. & Altova GmbH, "XML Spy 4.0 Manual," copyright 1998-2001, published Sep, 9, 2001, pp. 1-401.

Cagle et al., "Professional XSL", Wrox Press Ltd., 2001, cover and copyright pp. 9-21.

Castro, E., "XML for the World Wide Web, Visual Quickstart Guide", Peachpit Press, 2001, p. 245.

Castro, Elizabeth, "XML for the World Wide Web", Published by Peachpit Press, 2001, pp. 182-184.

Chipr, "AbiWord - Word Processing for Everyone", http://www.kuro5hin.org/?op=displaystory;sid=2002/4/22/22406/9615>, Apr. 23, 2002, 8 pgs.

Chiyoung Seo et al.; An efficient inverted index technique for XML documents using RDBMS; Received Jan. 16, 2002; Information and Software Technology 45 (2003), Jun. 1, 2002; pp. 11-22.

Dan Franks, "Crowd Control (Secrets)", 2002-06-01, MacWorld, vol. 19, No. 6, p. 102.

Danny HeijI; the Delphi XML SAX2 Component & MSXML 3.10; Dr. Dobbs Journal, Sep. 2001; pp. 42-54.

David Eisenberg, "Using XSL Formatting Objects", Jan. 17, 2001, pp. 1a and 1, http://www.xml.com/pub/a/2001/01/17/xsl-fo/index.html?page=2.

DevX Staff, "Twelve Dynamic HTML Lessons," downloaded from http://devx.com/projectcool/Article/18103/1763, published Jan. 1, 2000, pp. 1-3.

Dzuba, Vassili, "Majix '1.0: A WORD to XML Converter", downloaded from http://xml.coverpages.org/majix10Ann.html, Oct. 6, 1998, pp. 1-2.

Glenn, Walter, "Word 2000 in a Nutshell", O'Reilly & Associates, Inc., Aug. 2000, cover, copyright, and sections 16.4 and 16.3, downloaded pp. 1-8.

Harold, Rusty Elliotte, "XML Bible", IDG Books Worldwide, 1999, pp. 369-388.

HV, Ltd., "WorX Standard Edition (SE) 'XML Authoring Made Easy',", HyperVision, Ltd., published on the Internet as of Jun. 3, 2001 as a PDF file linked to http://web.archive.org/web/20010603152210/www.hvltd.com/default.asp?name=-information/xml/worxseOverview.xml&display=information/xsl/default.xsl, pp. 1-9 - No Copy Available, Dead Link.

HyperVision, Ltd., "WorX 2.1 Authoring Guide for XML 2001", Sep. 2001, downloaded from http://www.xmlconference.org/xmlusa/2001/XML2.1AuthoringGuideforXML2001.pdf, pp. 1-29.

Infinity-Loop, Web Site Home Page, re: infinity-loop, Apr. 20, 2001, 1 pg.

J. Geigel et al., "Automatic Page Layout Using Genetic Algorithms for Electronic Albuming", Proceedings of Electronic Imaging, Jan. 21-26. 12 pgs.

James E. Powell, "Microsoft Office Beta 2 on the Horizon", WinMag.com, Nov. 3, 2000.

Jeong, Euna et al., "Semistructured Data: Induction of Integrated View for XML Data With Heterogeneous DTDs", Proceedings of the Tenth International Conference on Information and Knowledge Management, Oct. 2001, pp. 151-158.

John Lombardi, "Word Pro Excels at 'Team' Work", Info World, Jan. 8, 1996, p. 86.

Jon Bosak, "XML: The Universal Publishing Format", 1998, pp. 1-2.

Jon Udell, "Getting Traction", Jul. 12, 2002.

JP Morgenthal; XML for Data Integration; EAI Journal, Oct. 2001; pp. 13-14, 16.

Kathy Yakal, "Elegant Document Distribution", Computer Shopper, Nov. 1995, pp. 1-2.

Klink et al., "Document Structure Analysis Based on Layout and Textual Features", Sep. 25, 2000, DFK1, pp. 1a, 3, 4, and 11.

Liberty, J. et al., "XML Web Documents from Scratch", Que Corporation, Mar. 10, 2000, cover, copyright, chapters 1 and 2, downloaded pp. 1-16.

Liefke, Harmut et al., "Xmill: an Efficient Compressor for XML Data", SCM SIGMOD Record, vol. 29, Issue 2, May 2000, pp. 153-164.

Linss, Peter, "CSS Namespace Enhancements (proposal)", Jun. 1999, W3C, pp. 1-7.

M. Fernandez and S. Amer-Yahia: Advanced Technology Seminar 2--Techniques for Storing XML; pp. 323, 774-776.

M. Kirjavainen, "XML Browsers", http://mia.ece.uic.edut/~papers/WWWMultimedicaStandards/XML_browsers.pdf, last accessed Mar. 14, 2005, 16 pgs.

M. Schrage, "Proxima, a presentation-oriented editor for structured documents", IPA, ISBN 12-345-6789-0, Jun. 4, 1973, pp. 1-186.

Mansfield, Ron, "Mastering Word 97 Fourth Edition", 1997, Sybex, pp. 269-270, 412, 449-457, 985-986, 1010- 1011, 1028-1029, 1031-1034.

Mansfield, Ron, "Mastering Word 97 Fourth Edition", 1997, Sybex, pp. 221-222, 271-273, 278, 280, 283-284, 325-330, 539-540, 1015.

Mathias Neumuller and John N. Wilson; Improving XML Processing Using Adapted Data Structures; Oct. 7-10, 2002; pp. 206-220.

McGrath, Robert, "Representing "Binary" Data in XML", downloaded from http://ndf.ncsa.uiuc.edu/HDF5/XML/tools/binary.html, Mar. 2001, pp. 1-4.

Meyer, Eric, "Cascading Style Sheets: HTML and CSS", May 2000, O'Reilly, pp. 1-17.

Michael Champion; Storing XML in Databases; EAI Journal, Oct. 2001; pp. 53-55.

Michael Floyd, "Debugging XML Applications", Aug. 2000, www.webtechniques.com, pgs. 79-81.

Microsoft, "Microsoft Word 2000", 1999, Microsoft, Screenshots 1-7, pp. 1-2.

Milbery, J., "WorX SE", XML Journal, published Feb. 4, 2001, downloaded from http://xml.syscon.com/read/40149.htm, downloaded pp. 1-5.

Moseley, Lonnie et al., "Mastering Microsoft Office 97 Professional Edition", Sybex, 1996, pp. 87, 94-98, 103- 105, 165-179, 1114-1115.

Munro, J., "StarOffice 6.0 Lives Up to its Name", PCMAG.com, May 23, 2002, www.pcmag.com/print_article2/0,1217,a=27287,00.asp, downloaded pp. 1-3.

Novak, U. et al., "Experimental XSLT Processor for Objects", Proceedings of the JASTED Int'l Conf. On Applied Informatics, Feb. 2002, pp. 277-282.

Oliver Meyer, "Creating Validated XML Documents on the Fly Using MS Word", Oct. 20, 2002, pp. 113- 121.

Patrick Marshall, "DocuShare 2.0 Makes Web Document Management Work", Sep. 27, 1999.

Pradeep Jain; "Creating XML from Microsoft Word: The Challenges", Dec. 3-8, 2000, pp. 136-144.

Ray, Erik T., "Learning XML", O'Reilly & Associates, Inc., Jan. 2001, cover, copyright, and Chapter 5 downloaded pp. 1-25.

Robert D. Cameron; REX: XML shallow parsing with regular expressions; Markup Languages: Theory & Practice 1.3, Summer 1999; pp. 61-88.

Rodriguez, M., "XML: Twig", xmltwig.com, copyright 2003, downloaded pp. 1-4, web.archive.org/web/20030422002120/http://www.xmltwig.com/xmltwig/tools/xml_spellcheck.

Rusty Elliotte, "XML Bible", IDG Books Worldwide, Inc., 1999, pp. 1-12, 120-127, 333-335.

Schmelzer, Ronald, "ZapThink Briefing Note - HyperVision - Automating Valid XML Document Creation Within Microsoft Word", ZapThink LLC, Feb. 8, 2002, pp. 1-6.

Scott Boggan and Micael De Laurentis, A System for Matching static or distortable fonts; May 1994; pp. 1-9; http://www.byte.com/art/940/sec12/artl.htm.

Sihem Amer-Yahia, Mary Fernandez, Divesh Srivastava and Yu Xu; PIX: A System for Phrase Matching in XML Documents: A Demonstration; 2003 IEEE; pp. 774-776.

Simplson, J., "Just XML", Prentice Hall, Second Edition, 2001, cover, copyright page and p. 31.

Skylar, D., "The Annotated Rainbow DTD, Rainbow Version 2.5", Electronic Book Technologies, Inc., Feb. 8, 1995, pp. 1-12.

Star Office XML File Format Working Draft, Sun Microsystems, Inc., pp. 1, 19, and 196.

Sun Microsystems, "StarOffice XML File Format Working Draft", Jan. 2001, Draft 10, pp. 19, 89, 142, and 234, http://web.arehive.org/web/20010603030227/xml.openoffice.org/xml_specification_draft.pdf.

Sun Microsystems, "The OpenOffice.org Source Project", Sun Microsystems, Inc., 2000, downloaded pp. 1-34.

Surajit Chaudhuri and Kyuseok Shim; Storage and Retrieval of XML Data using Relational Databases; Advanced Technology Seminar 4; Abstract; Mar. 5, 2003; p. 802.

Tetrasix, "Welcome to Tetrasix Web Site", re: MajiX, Apr. 18, 2001, downloaded pp. 1-3.

Torsten Grabs et al.; XMLTM: Efficient Transaction Management for XML Documents; CIKM'02, Nov. 4-9, 2002; pp. 142-152.

Ullas Nambiar et al.; Efficient XML Data Management: An Analysis; EC-Web 2002, LNCS 2455; pp. 87-98.

Unicode Inc., "Unicode Technical Reports", Sep. 21, 2002, pp. 1, 2, 638, 642, and 644.

Uros Novak et al., "Experimental XSLT Processor for Objects", Proceedings of the IASTED International Conference, Applied Informatics, Feb. 18-21, 2002, pp. 277-282.

V. Turau, "Making legacy data accessible for XML applications", University of Applied Sciences, Department of Computer Science, Wiesbaden, Germany, 1999, pp. 1-11.

Volkan Atalay and Erkan Arslan; An SGML Based Viewer for Form Documents; 1999 IEEE Jul. 1999; pp. 201-204.

W. Wadge, "Intentional Markup Language", Proceedings of the Third International Workshop, DGW 2000, Quebec City, Canada, Jun. 19-21, 2000, pp. 82-89.

W3C, "XML Schema Part 0: Primer", W3C Recommendation, May 2, 2001, downloaded pp. 1-67.

W3C, "XML Schema Requirements", W3C Note, Feb. 15, 1999, downloaded from www.w3.org/TR/NOTExml-schema-req, pp. 1-5.

W3C, Fonts, Jan. 24, 2001, W3C, pp. 1-4, http://web.archive.org/web/20010124044900/ttp://www13.w3.org/TR/REC-CSS2/fonts.html#matching.

Walther, P., "XML Dokumente in Microsoft Word mit neuem Pnadukt der struktur Ag kostenlos testen", http://www.contentmanager.de/magazine/news_h2695_xml_dokumente_in_microsoft_word_mit_neuem.html>, Jun. 5, 2002, 2 pgs.

Watchorn, H. et al., "Word and XML: Making the 'Twain Meet", XML Europe 2001, papers, May 2001, downloaded pp. 1-11.

WayBack Machine, Feb. 15, 2006, pg. I. http://web.archive.org/web/*/http://www.w3.org/TR/REC-CSS2/fonts.html - No Copy Available, Dead Link.

Wen, Howard, "AbiWord: Open Source's Answer to Microsoft Word", Linux Dev Center, downloaded from http://www.linuxdeveenter.com/lpt/a/1636, Mar. 14, 2002, pp. 1-3.

XHTMLExamples, "XHTML explained -- XHTML Examples," downloaded from http://web.archive.org/web/20020603200919/http://www.javascriptkit.com/howto/xhtml_intro4.Shtml, published Jun. 3, 2002, pp. 1-3.

Xin Zhang et al.; Clock: Synchronizing Internal Relational Storage with External XML Documents; 2001 IEEE Jun. 2001; pp. 111-118.

Xmetal 1.0, Webreference.com, Oct. 29, 1999, downloaded pp. 1-2, www.webreference.com/html/watch/xmeta1/5.html.

XML Workshop Ltd., "Word to XML Converters", Mar. 7, 2003, downloaded pp. 1-2.

YAWC Pro, "Welcome to YAWC Pro", Dec. 11, 2001, 1 pg.

Castro, Elizabeth, "XML for the World Wide Web: Visual QuickStart Guide," Oct. 23, 2000, Peachpit Press, pp. 1-6.

Harold, Rusty Elliotte, "XML Bible", IDG Books Worldwide, 1999, title page, copyright page, and pp. 1-15, 95-132, 191-200, 333-336, 352-360, and 433-567.

M. Fernandez et al., "Advanced Technology Seminar," p. 323 (Feb. 21, 2002).

O'Reilly, "HTML & XHTML the Definitive Guide," 4th Edition, Copyright 2000, pp. 1-6, http://oreilly.jungles.ru/webdesign/xhtml/ch16_03.htm.

Sun Microsystems, "StarOffice XML File Format Working Draft", Jan. 2001, Draft 10, pp. 19 and 234, http://web.archive.org/web/20010603030227/xml.openoffice.org/xml_specification_draft.pdf.

Sun Microsystems, "StarOffice XML File Format Working Draft", Jan. 2001, Draft 10, pp. 48, 49, 51, 54-58.

Castro, Elizabeth, "XML for the World Wide Web: Visual QuickStart Guide," Oct. 23, 2000, Peachpit Press, pp. 1-6.

Harold, Rusty Elliotte, "XML Bible", IDG Books Worldwide, 1999, title page, copyright page, and pp. 1-15, 95-132, 191-200, 333-336, 352-360, and 433-567.

O'Reilly, "HTML & XHTML the Definitive Guide," 4th Edition, Copyright 2000, pp. 1-6, http://oreilly.jungles.ru/webdesign/xhtml/ch16_03.htm.

Sun Microsystems, "StarOffice XML File Format Working Draft", Jan. 2001, Draft 10, pp. 48, 49, 51, 54-58.

Castro, Elizabeth, "XML for the World Wide Web: Visual QuickStart Guide," Oct. 23, 2000, Peachpit Press, pp. 1-6.

Harold, Rusty Elliotte, "XML Bible", IDG Books Worldwide, 1999, title page, copyright page, and pp. 1-15, 95-132, 191-200, 333-336, 352-360, and 433-567.

M. Fernandez et al., "Advanced Technology Seminar," p. 323 (Feb. 21, 2002).

O'Reilly, "HTML & XHTML the Definitive Guide," 4th Edition, Copyright 2000, pp. 1-6, http://oreilly.jungles.ru/webdesign/xhtml/ch16_03.htm.

Sun Microsystems, "StarOffice XML File Format Working Draft", Jan. 2001, Draft 10, pp. 19 and 234, http://web.archive.org/web/20010603030227/xml.openoffice.org/xml_specification_draft.pdf.

Sun Microsystems, "StarOffice XML File Format Working Draft", Jan. 2001, Draft 10, pp. 48, 49, 51, 54-58.

* cited by examiner

```xml
<w:lists>
  <w:listDef w:listDefId="0">
    <w:lsid w:val="004167F8" />
    <w:plt w:val="HybridMultilevel" />
    <w:tmpl w:val="D00A8AB8" />
    <w:lvl w:ilvl="0" w:tplc="0409000F">
      <w:start w:val="1" />
      <w:lvlText w:val="%1." />
      <w:lvlJc w:val="left" />
      <w:pPr>
        <w:tabs>
          <w:tab w:val="list" w:pos="720" />
        </w:tabs>
        <w:ind w:left="720" w:hanging="360" />
      </w:pPr>
    </w:lvl>
    <w:lvl w:ilvl="1" w:tplc="04090019">
      <w:start w:val="1" />
      <w:nfc w:val="4" />
      <w:lvlText w:val="%2." />
      <w:lvlJc w:val="left" />
      <w:pPr>
        <w:tabs>
          <w:tab w:val="list" w:pos="1440" />
        </w:tabs>
        <w:ind w:left="1440" w:hanging="360" />
      </w:pPr>
    </w:lvl>
  </w:listDef>
  <w:list w:ilfo="1">
    <w:ilst w:val="0" />
  </w:list>
</w:lists>
```

*Fig. 3*

```
<w:lists>
    <w:listPicBullet w:listPicBulletId="0">
        <w:pict>
            <w:binData w:name="wordml://01000002.gif">R0lGODlhDwAPAHcAACH/
                C01TT0ZGSUNFOS4wDQAAAAFzUkdCAK7OHOkAIf8LTVNPRkZ
                JQ0U5LjAYAAAADG1zT1BNU09GRklDRTkuMALxmbSWACH/
                C01TT0ZGSUNFOS4wGAAAAAxjbVBQSkNtcDA3MTICAAAEfG0u
                lAAh+QQBAAAACwAAAAADwAPAIHAwMD/
                AAABAgMBAgMCHYSPqct9AaOEb9pqJc7UcO19HSCOZbBxabZeo
                VgAADs=</w:binData>

<v:shape id="_x0000_i1033" type="#_x0000_t75"
                style="width:11.4pt;height:11.4pt" o:bullet="t">
                <v:imagedata src="wordml://01000002.gif" o:title="BD10264_" />
            </v:shape>
        </w:pict>
    </w:listPicBullet>
    <w:listDef w:listDefId="1">
        <w:lsid w:val="232574F0" />
        <w:plt w:val="Multilevel" />
        <w:tmpl w:val="4336D566" />
        <w:lvl w:ilvl="0">
            . . .
    </w:listDef>
    <w:list w:ilfo="5">
        <w:ilst w:val="1" />
    </w:list>
</w:lists>
```

REPRESENTING LIST DEFINITIONS AND INSTANCES IN A MARKUP LANGUAGE DOCUMENT

RELATED APPLICATIONS

This patent application is a continuation-in-part application under 35 United States Code § 120 of U.S. patent application Ser. No. 10/187,060 filed on Jun. 28, 2002, which is incorporated herein by reference. An exemplary schema in accordance with the present invention is disclosed in a file entitled Appendix.txt in a CDROM attached to an application entitled "Mixed Content Flexibility," Ser. No. 10/726,077, filed Dec. 2, 2003, which is hereby incorporated by reference in its entirety.

COMPUTER PROGRAM LISTING APPENDIX

A computer listing is included in a Compact Disc appendix in the attached CD ROM (quantity of two) in IBM-PC using MS-Windows operating system, containing file Appendix.txt, created on Dec. 20, 2006, containing 20,480 bytes (Copy 1 and Copy 2) and is hereby incorporated by reference in its entirety.

BACKGROUND OF THE INVENTION

Markup Languages have attained wide popularity in recent years. One type of markup language, Extensible Markup Language (XML), is a universal language that provides a way to identify, exchange, and process various kinds of data. For example, XML is used to create documents that can be utilized by a variety of application programs. Elements of an XML file have an associated namespace and schema.

In XML, a namespace is a unique identifier for a collection of names that are used in XML documents as element types and attribute names. The name of a namespace is commonly used to uniquely identify each class of XML document. The unique namespaces differentiate markup elements that come from different sources and happen to have the same name.

XML Schemata provide a way to describe and validate data in an XML environment. A schema states what elements and attributes are used to describe content in an XML document, where each element is allowed, what types of text contents are allowed within it and which elements can appear within which other elements. The use of schemata ensures that the document is structured in a consistent manner. Schemata may be created by a user and generally supported by an associated markup language, such as XML. By using an XML editor, the user can manipulate the XML file and generate XML documents that adhere to the schema the user has created. XML documents may be created to adhere to one or more schemata.

The XML standard is considered by many as the ASCII format of the future, due to its expected pervasiveness throughout the hi-tech industry in the coming years. Recently, some word-processors have begun producing documents that are somewhat XML compatible. For example, some documents may be parsed using an application that understands XML. However, much of the functionality available in word processor documents is not currently available for XML documents.

SUMMARY OF THE INVENTION

The present invention is generally directed towards a method for representing list definitions and instances in a markup language (ML) document such as an XML document. The lists are generated in the ML document as a group of paragraphs, where the paragraph type is one of the list types defined for the document. The lists provide a method for defining a bullet or numbering style as well as providing indentation and format information for a particular list.

More particularly, the present invention relates to representing numbered and bulleted list information in ML so that applications capable of reading a given ML file format, but running in environments where the list generation information has not been installed, are able to still render the lists. The ML document may be manipulated on a server or anywhere even when the application creating the ML document is not present. List definition and instance information (i.e., properties) are saved in a markup language (ML) document without data loss, while allowing the lists to be parsed by ML-aware applications and to be read by ML programmers.

DETAILED DESCRIPTION OF THE PREFERRED EMBODIMENT

Throughout the specification and claims, the following terms take the meanings explicitly associated herein, unless the context clearly dictates otherwise.

The terms "markup language" or "ML" refer to a language for special codes within a document that specify how parts of the document are to be interpreted by an application. In a word-processor file, the markup language specifies how the text is to be formatted or laid out, whereas in a particular customer schema, the ML tends to specify the text's meaning according to that customer's wishes (e.g., customerName, address, etc). The ML is typically supported by a word-processor and may adhere to the rules of other markup languages, such as XML, while creating further rules of its own.

The term "element" refers to the basic unit of an ML document. The element may contain attributes, other elements, text, and other building blocks for an ML document.

The term "tag" refers to a command inserted in a document that delineates elements within an ML document. Each element can have no more than two tags: the start tag and the end tag. It is possible to have an empty element (with no content) in which case one tag is allowed.

The content between the tags is considered the element's "children" (or descendants). Hence, other elements embedded in the element's content are called "child elements" or "child nodes" or the element. Text embedded directly in the content of the element is considered the element's "child text nodes". Together, the child elements and the text within an element constitute that element's "content".

The term "attribute" refers to an additional property set to a particular value and associated with the element. Elements may have an arbitrary number of attribute settings associated with them, including none. Attributes are used to associate additional information with an element that will not contain additional elements, or be treated as a text node.

Illustrative Operating Environment

Figure 1:
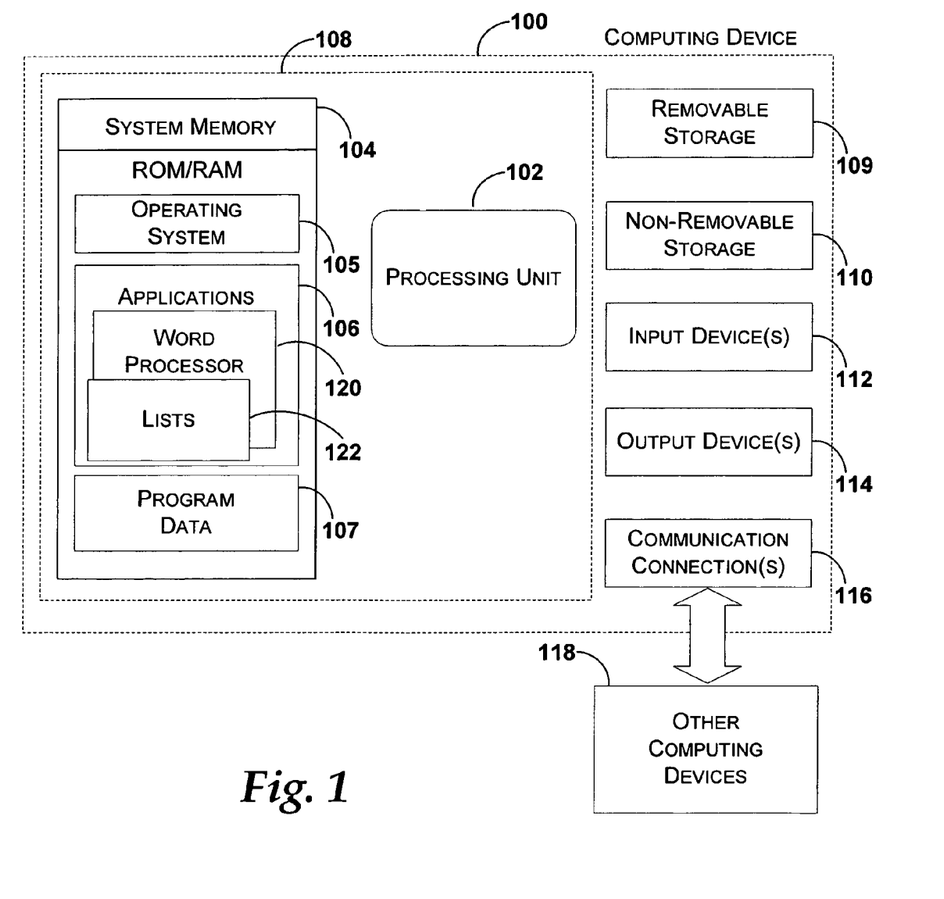
FIG. 1 illustrates an exemplary computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a word-processor application 120 that further includes lists 122. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Generally, the present invention is directed at representing numbered and bulleted list definitions and instances in an ML document. The ML document may be read by applications that do not share the same schema that created the document.

Figure 2:
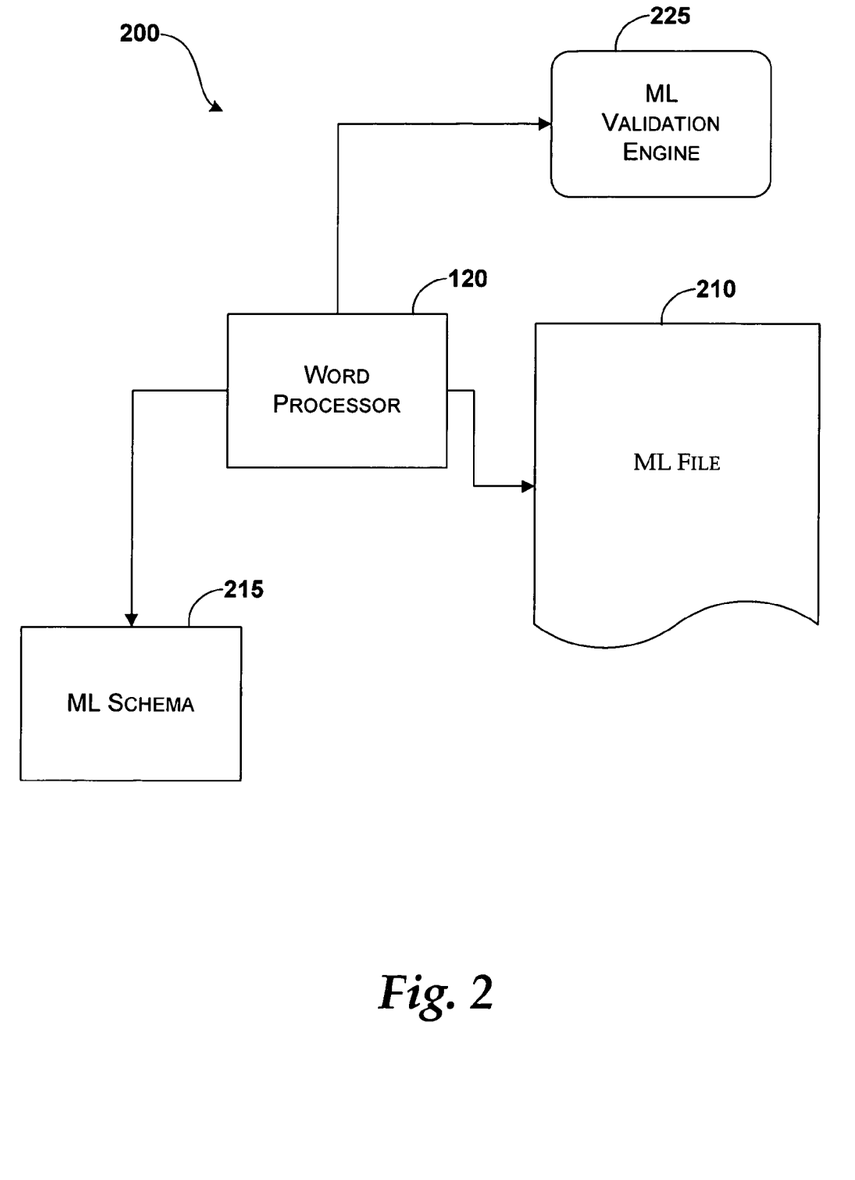
FIG. 2 is a block diagram illustrating an exemplary environment for practicing the present invention.

FIG. 2 is a block diagram illustrating an exemplary environment for practicing the present invention. The exemplary environment shown in FIG. 2 is a word-processor environment 200 that includes word-processor 120, ML file 210, ML Schema 215, and ML validation engine 225.

In one embodiment, word-processor 120 has its own namespace or namespaces and a schema, or a set of schemas, that is defined for use with documents associated with word-processor 120. The set of tags and attributes defined by the schema for word-processor 120 define the format of a document to such an extent that it is referred to as its own native ML. Word-processor 120 internally validates ML file 210. When validated, the ML elements are examined as to whether they conform to the ML schema 215. A schema states what tags and attributes are used to describe content in an ML document, where each tag is allowed, and which tags can appear within other tags, ensuring that the documentation is structured the same way. Accordingly, ML 210 is valid when structured as set forth in arbitrary ML schema 215.

ML validation engine 225 operates similarly to other available validation engines for ML documents. ML validation engine 225 evaluates ML that is in the format of the ML validation engine 225. For example, XML elements are forwarded to an XML validation engine. In one embodiment, a greater number of validation engines may be associated with word-processor 120 for validating a greater number of ML formats.

Representing List Definitions and Instances in a Markup Language Document

The present invention generally provides a method to represent an application's numbered and bulleted list information in markup language (ML) such as XML. The lists may be parsed by applications that understand the markup other than the application that generated the ML file.

An exemplary list may be the following:
1. One
2. Two

In the list above, there are two items. The items are each members of the same list, and the same list style. A basic representation of the XML structure for the list includes a structure where a list that includes a particular list style is defined at the beginning of the document, and then used in the body of the document to generate the list including the list items. For example, if the list style corresponding to the list above were called "Listl", and the Unique ID for that list were "11", then the following document structure may result:

Document
Styles
Lists
ListDef
  ID=1
List
  val=1 (This matches to the ID of a list definition)
  ilfo=11
Body
Paragraph (StyleName="MsoNormal" ListLevel="1" ListFO="11")
  TextRun
    "One"
Paragraph (StyleName="MsoNormal" ListLevel="1" ListFO="11")
  TextRun
    "Two"

As may be seen, a list item is defined according to a paragraph element that is identified as a member of a particular list defined earlier in the ML document. As is seen in the example structure, the definition of the list occurs at the top of the ML document alongside the definition for the styles used in the document. In one embodiment, the root element of the ML document may contain an element called "<w:lists>" that defines the lists used in the ML document.

Two items of the lists are defined at the top of the document. The first item is the definition of a list type. The definition of the list type identifies all the formatting and other appearance properties for the type of list. Then, for each individual list that exists in the document, a <list> tag is generated after the list definitions. The <list> tag is unique for the list that is referencing it. The <list> tag identifies which list definition it is based on, as well as the tag's ID so that the paragraphs in the document that are part of this list can reference the list properly.

In another embodiment, multi-level lists are supported such that a "lvl" element is included in the lists definition. The lvl tag contains the information for list items that appear on that level. Take the following list for example:

1. One
    a. One A
    b. One B
2. Two
    a. Two A
        i. Two A i

All the items in the above list are substantially the same. However, certain items on the list are on different levels. The lvl tag allows the list to define various elements for each level of the list such as the indentation of each level and the character representing each level. Most of the information for how the list looks may be contained within the various lvl tags. In one embodiment, each lvl tag includes an ilvl attribute which specifies which level is being defined.

Once each list type is defined, the different lists used within the document are defined. List overrides are used when the list items in a document are not part of the same list. An example of multiple lists may include lists such as the following:

1. One
2. Two
3. Three and:
1. A
2. B
3. C

Even though both lists look the same, they are actually separate lists. If they were the same list, then the "A" would have started at 4 (it would continue the previous one). A list override is generated to reference the same list definitions, but declares itself as being a unique list. The paragraphs in the document that are part of a list then reference the list override.

The following example list includes picture bullets:
❖ The quick brown fox jumps over the lazy dog.
    ➢ The quick brown fox jumps over the lazy dog.
        The quick brown fox jumps over the lazy dog.
❖ The quick brown fox jumps over the lazy dog.
    ➢ The quick brown fox jumps over the lazy dog.

To implement the picture bullets in the above list, the image information for the picture bullets is stored within the ML file. In one embodiment, the image information is stored using a "<w:listPicBullet>" element that is a child of the "<w:lists>" element. The listPicBullet element includes a "pict" and an "@listPicBulletId" attribute. The pict element inlcudes the image data for the picture. The listPicBulletId attribute includes the identifier of that picture bullet. List definitions then (i.e., defined by the w:listDef tag) may reference the picture bullet by it's identifier with the <w:lvlPicBulletId> tag.

Figure 3:
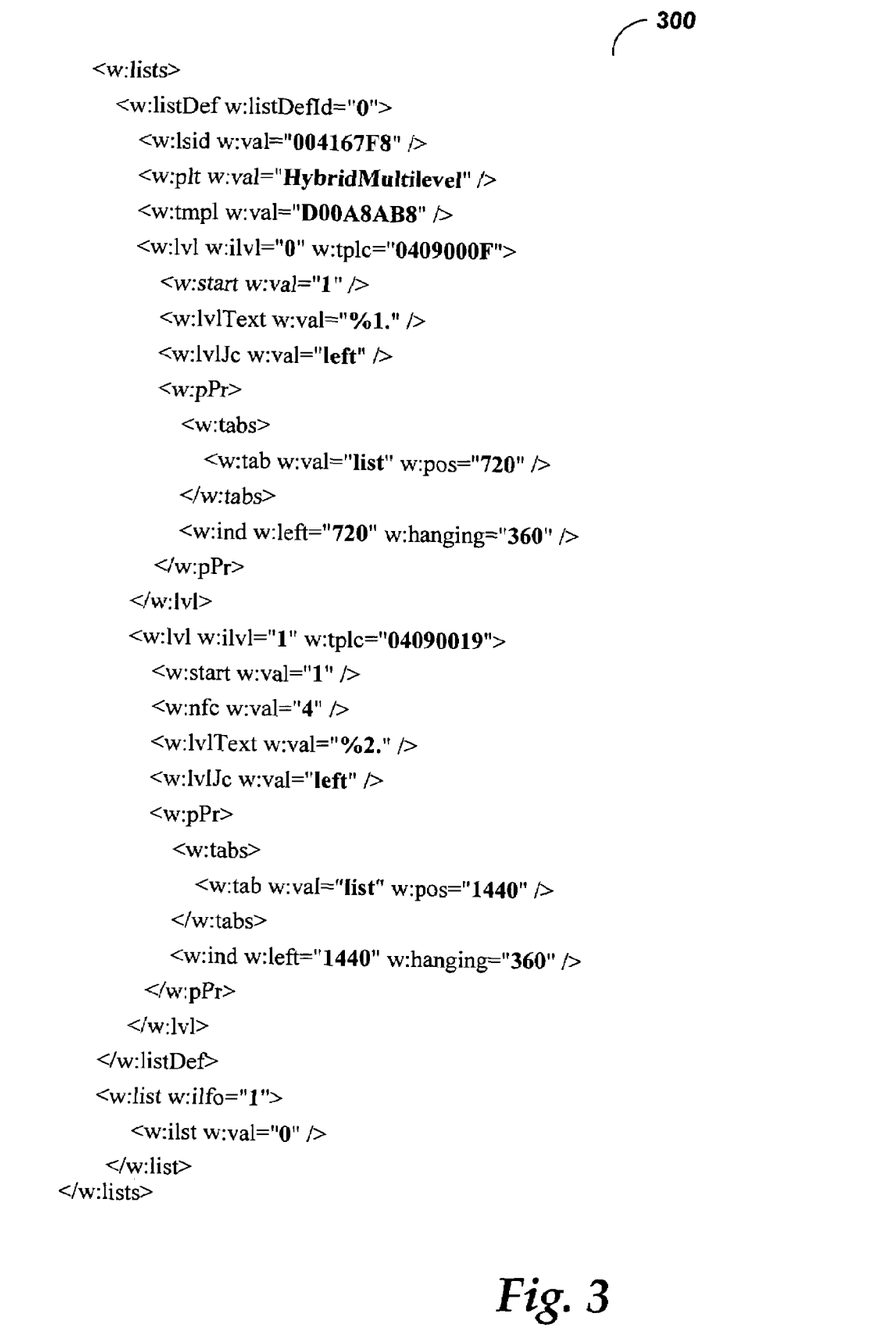
FIG. 3 illustrates an exemplary portion of an ML file that provides a definition for a numbered list that includes multiple levels.

FIG. 3 illustrates an exemplary portion of an ML file that provides a definition for a numbered list that includes multiple levels, in accordance with aspects of the present invention.

The definition for the list shown includes two defined levels. It is appreciated that any number of levels may be defined. The list definition provides a variety of information about each list level used within a list, including the list level position on the page, the tab position of the list level, the justification of the list level, a value or identifier of the list level, and other information. The list definition is later used to reference each list level within the body of the ML document.

Figure 4:
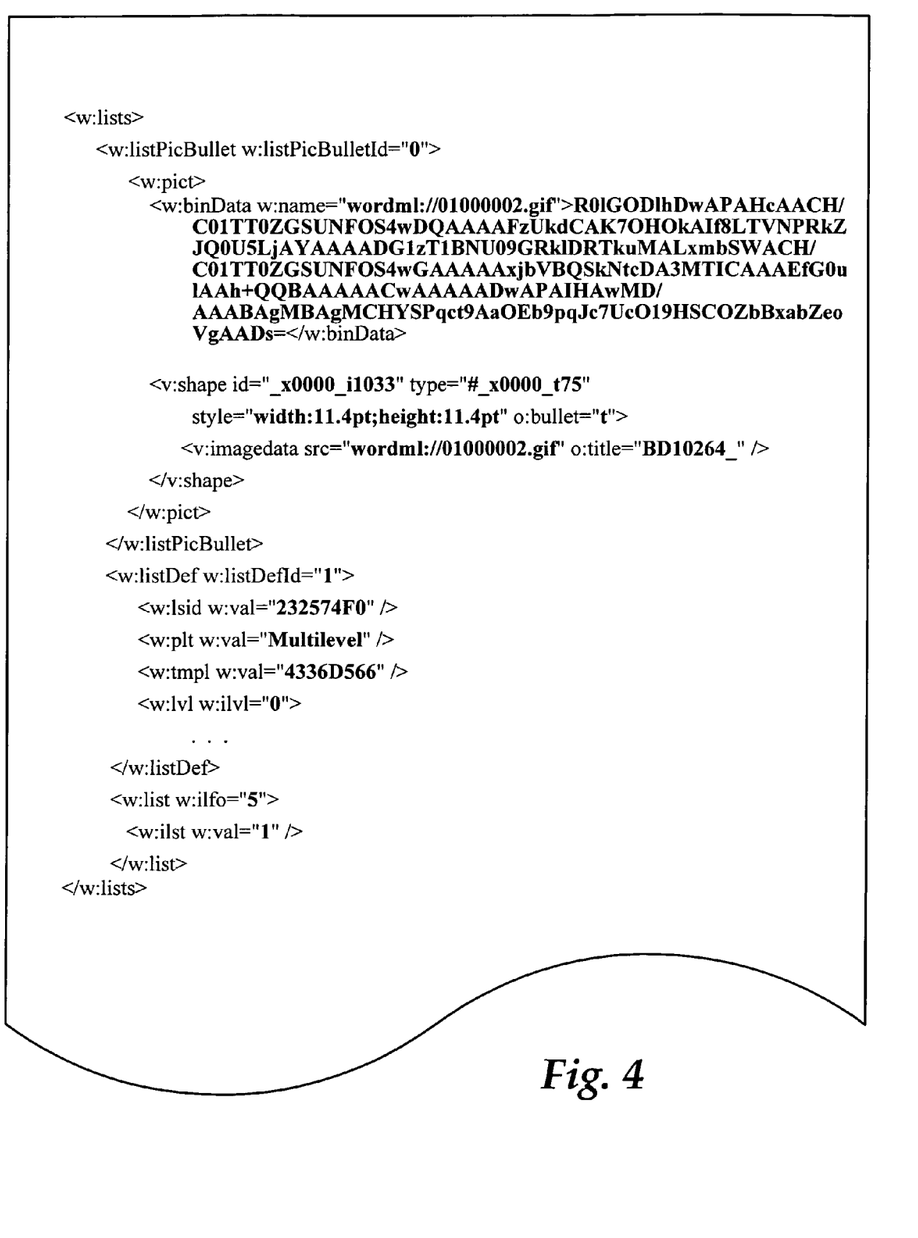
FIG. 4 illustrates an exemplary portion of an ML file that provides a definition for a picture bulleted list.

FIG. 4 illustrates an exemplary portion of an ML file that provides a definition for a picture bulleted list, in accordance with aspects of the present invention.

The definition of the list shown includes a description of a picture bullet used within a list that is present in the body of the ML file. The picture bullet use is described according to a name that is associated with descriptive binary data for that picture bullet. The list definition also includes an identifier for the picture bullet within the ML file, a style for the picture bullet, a shape identifier and other information that describes the bullet for reference later in the list that is present within the body of the ML file. It is appreciated that any number of picture bullet descriptions may be included within an ML file other than the picture bullet description exemplified in FIG. 4.

Figure 5:
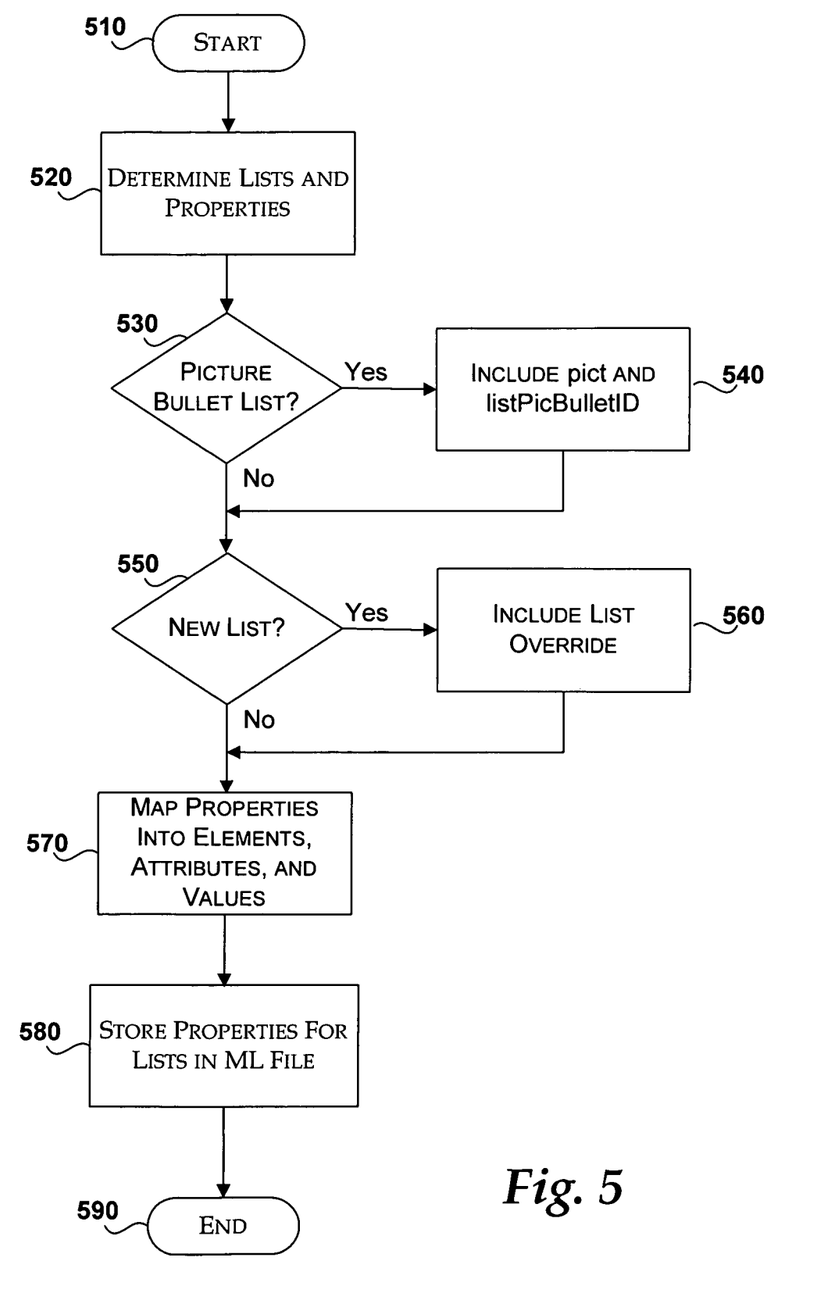
FIG. 5 shows an exemplary flow diagram for representing list definitions and instances in a ML document, in accordance with aspects of the invention.

FIG. 5 shows an exemplary flow diagram for representing list definitions and instances in a ML document, in accordance with aspects of the invention. After start block 510, the process flows to block 520 where the list information within a document such as a word-processor document, is determined. The list information used within a document may include many different types of lists such as bulleted lists and numbered lists, including those that are not natively supported by later applications parsing the document. Once the list information is determined, processing proceeds to decision block 530.

At decision block 530, a determination is made whether the document includes a list that corresponds to a picture bulleted list. When the list being examined is not a picture bulleted list, processing advances to block 550. However, if the list is a picture bulleted list, processing moves to block 540.

At block 540, the "pict" element and the "listPicBulletID" attribute are included among the elements, attributes, and values to which the list properties will be mapped. The "pict" element includes the image data for the picture that comprises the bullet, and the "listPicBulletID" attribute includes the id of that picture bullet. After the "pict" element and the "listPicBulletID" attribute are included, processing continues at decision block 550.

At decision block 550, a determination is made whether the list being examined is a new list within a document that already includes a list. If the list is not a new list, but is rather the first list within the document, processing advances to block 570. However, if the list is new list within a document that already includes a list, processing continues at block 560.

At block 560, a list override is included for mapping the list properties so that the multiple lists are separated in the ML file. In one embodiment, a list override is necessary with consecutive lists within the document that are not separated by other text. In other embodiments, a list override is included between each list of the document despite intervening fields within the document. Including the list override ensures that the correct bullet or number corresponds to the correct list item when the ML file is parsed. Processing continues at block 570.

At block 570, the properties of the lists within the document are mapped into elements, attributes, and values of the ML file. The lists and the properties associated with the lists may change from page to page, section to section, chapter to chapter and the like. There may be more than one mapping, therefore, per document. Once the list properties are mapped, or written to the ML file, processing moves to block 580.

At block 580, the properties of the lists are stored in a ML document that may be read by applications that understand the ML. Once the properties are stored, processing moves to end block 590 and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for representing list information in a markup language document, comprising:
   at a computing device, internally representing an application document in a word-processing application, wherein the internal representation is in a non-markup language format that is native to the application and the internal representation comprises unique properties for describing lists of data within the document, wherein the unique properties are defined by the application;
   at the computing device, determining one or more unique properties corresponding to a list that relates to at least one section of the application document;
   at the computing device, mapping the determined properties of the list into at least one of a markup language element, an attribute, and/or a value; and
   at the computing device, storing the mapped properties of the list in the markup language document, wherein the markup language document is manipulable on a system including one of a server and another system to substantially reproduce the list without using the application that generated the markup language document.

2. The method of claim 1, further comprising determining whether the list is a picture bulleted list.

3. The method of claim 2, wherein a specified element and attribute are included to store the picture bullet image information and picture bullet identifier when the list is a picture bullet list.

4. The method of claim 1, further comprising determining whether the list is a new list within the application document, wherein the list is a new list when the application document includes a previously presented list within the document.

5. The method of claim 4, further comprising providing a list override such that the instances and definitions of the new list and the previously presented list are separated when stored in the markup language document.

6. The method of claim 1, wherein mapping the properties further comprises mapping a level tag that corresponds to the level of an item within a list.

7. The method of claim 6, wherein the level tag allows the list to define the indentation of a level and the character used to represent the level.

8. The method of claim 1, further comprising:
   determining properties corresponding to an additional list that relates to at least one section of the application document;
   mapping the properties of the additional list into at least one of a markup language element, an attribute, and/or a value;
   including a list override to separate the instance of the list and the additional list; and
   storing the mapped properties of the additional list in the markup language document.

9. The method of claim 1, wherein the mapped properties of the list stored in the markup language document are understood by an application that understands the markup language when the list is not native to the application.

10. A computer storage medium for representing list definitions and instances in a markup language document, comprising:
    internally representing a word-processing document in a word-processing application, wherein the internal representation is in a non-markup language format that is native to the application and the internal representation comprises unique properties for describing lists of data within the document, wherein the unique properties are defined by the application;
    determining one or more unique properties relating to a list used within the word-processing document;
    based at least in part on the determined properties, determining whether the list is a new list that follows a previously determined list;
    including a list override with the determined properties when the list is a new list such that the instance of the list is separated from the instance of the previously determined list;
    mapping the determined properties into at least one of a markup language element, an attribute, and/or a value; and
    storing the mapped properties in the markup language document such that the list is substantially maintained when the markup language document is parsed by an application and the markup language document is manipulable on a system including one of a server and another system to substantially reproduce the list without using the application that generated the markup language document.

11. The computer storage medium of claim 10, wherein the mapped properties of the list stored in the markup language document are understood by an application that understands the markup language when the list is not native to the application.

12. The computer storage medium of claim 10, further comprising determining whether the list is a picture bulleted list.

13. The computer storage medium of claim 12, wherein a specified element and attribute are included to store the picture bullet image information and picture bullet identifier when the list is a picture bullet list.

14. A computer system for representing list definitions and instances in a markup language document, comprising:
    a processor;
    an application executing on the processor that is configured to:
       internally represent an application document in a word-processing application in a non-markup language format that is native to the application and comprising unique properties for describing lists of data within the document, wherein the unique properties are defined by the application;
       determine one or more unique properties relating to a list included in at least one section of the application document;
       map the determined properties into at least one of a markup language element, an attribute, and/or a value; and store the mapped properties in the markup language document, wherein the markup language document is manipulable on a system including one of a server and another system to substantially reproduce the list without using the application that generated the markup language document; and a validation engine configured to validate the stored markup language document.

15. The system of claim 14, wherein the properties of the list stored in the markup language document are understood by an additional application that understands the markup language when the list is not native to the additional application.

16. The system of claim 14, wherein the application is further configured to determine whether the list is a picture bulleted list.

17. The system of claim 16, wherein a specified element and attribute are included to store the picture bullet image information and picture bullet identifier when the list is a picture bullet list.

18. The system of claim 14, wherein the application is further configured to determine whether the list is a new list within the application document, wherein the list is a new list when the application document includes another list previously presented within the document.

19. The method of claim 14, wherein the application is further configured to provide a list override such that the instances and definitions of each list are separated when stored in the markup language document.

20. A method for representing list information in a markup language document, comprising:

at a computing device, inputting an application document that has been generated by a word-processing application that uses a non-markup language file format that is specific to the application, wherein the file format comprises unique properties of lists, wherein the unique properties are defined by the application;

at the computing device, determining one or more unique properties corresponding to a list that relates to at least one section of the application document;

at the computing device, mapping the properties of the list into at least one of a markup language element, an attribute, and/or a value; and at the computing device, storing the properties of the mapped list properties in the markup language document whereby applications different from the application can understand the mapped list properties stored in the markup language document manipulable on a system including one of a server and another system to substantially reproduce the list without using the application that generated the markup language document.

* * * * *